United States Patent
Hoban et al.

(10) Patent No.: US 9,652,207 B2
(45) Date of Patent: May 16, 2017

(54) STATIC TYPE CHECKING ACROSS MODULE UNIVERSES

(71) Applicant: MICROSOFT TECHNOLOGY LICENSING, LLC., Redmond, WA (US)

(72) Inventors: Lucas J. Hoban, Seattle, WA (US); Mads Torgersen, Issaquah, WA (US); Charles P. Jazdzewski, Redmond, WA (US); Anders Hejlsberg, Seattle, WA (US); Steven E. Lucco, Bellevue, WA (US); Joseph J. Pamer, Seattle, WA (US)

(73) Assignee: MICROSOFT TECHNOLOGY LICENSING, LLC., Redmond, WA (US)

(*) Notice: Subject to any disclaimer, the term of this patent is extended or adjusted under 35 U.S.C. 154(b) by 122 days.

(21) Appl. No.: 13/798,088

(22) Filed: Mar. 13, 2013

(65) Prior Publication Data
US 2014/0282441 A1    Sep. 18, 2014

(51) Int. Cl.
*G06F 9/44* (2006.01)
*G06F 9/45* (2006.01)

(52) U.S. Cl.
CPC ............ *G06F 8/437* (2013.01); *G06F 8/20* (2013.01)

(58) Field of Classification Search
CPC ... G06F 8/20; G06F 8/41; G06F 8/437; G06F 8/51
See application file for complete search history.

(56) References Cited

U.S. PATENT DOCUMENTS

| | | | | |
|---|---|---|---|---|
| 5,586,328 A | * | 12/1996 | Caron | G06F 8/48 717/112 |
| 6,083,282 A | * | 7/2000 | Caron et al. | 717/101 |
| 6,195,792 B1 | | 2/2001 | Turnbull et al. | |
| 6,381,736 B1 | * | 4/2002 | Klotz et al. | 717/114 |
| 6,941,550 B1 | | 9/2005 | Sollich | |

(Continued)

FOREIGN PATENT DOCUMENTS

| | | |
|---|---|---|
| EP | 2096534 A1 | 9/2009 |
| EP | 2141587 A1 | 1/2010 |

OTHER PUBLICATIONS

Microsoft, "TypeScript Language Specification", Version 0.8, Oct. 2012, pp. 1-97.*

(Continued)

*Primary Examiner* — Thuy Dao
*Assistant Examiner* — Cuong V Luu (57) ABSTRACT

Static type checking can be performed on types and values defined in modules in a system that dynamically composes programs from modules. The types and values do not share a global namespace. Each module defines its own module universe, disjoint from other modules. A language mechanism can establish a local name binding to one module within the content of another module. When type checking at compile time an environment can be established that corresponds to a runtime instance of the program. The static type system can be arranged to align with the runtime values, such that the names used to refer to objects at runtime are the same as the names used to refer to the types of those objects in the static type system. Aliases of a particular type are resolved to a known compile time description of the type.

20 Claims, 5 Drawing Sheets

(56) References Cited

U.S. PATENT DOCUMENTS

| | | | |
|---|---|---|---|
| 7,237,226 B2 | 6/2007 | Simonyi | |
| 7,350,198 B2 | 3/2008 | Kluger et al. | |
| 7,523,443 B2 | 4/2009 | DeVane | |
| 7,590,980 B1* | 9/2009 | Clubb | G06F 9/44526 717/114 |
| 7,730,448 B2 | 6/2010 | Meijer et al. | |
| 8,032,859 B2* | 10/2011 | Meijer | G06F 9/4433 717/106 |
| 8,122,440 B1* | 2/2012 | Lentini et al. | 717/141 |
| 8,332,385 B2 | 12/2012 | Moor et al. | |
| 8,473,897 B2* | 6/2013 | Box et al. | 717/106 |
| 8,713,528 B1 | 4/2014 | Conrad et al. | |
| 2002/0100033 A1 | 7/2002 | Halstead, Jr. et al. | |
| 2003/0159057 A1 | 8/2003 | Mangold et al. | |
| 2003/0167458 A1 | 9/2003 | Santhanam et al. | |
| 2003/0208605 A1* | 11/2003 | Vu | G06F 9/443 709/227 |
| 2004/0210869 A1 | 10/2004 | DeVane | |
| 2004/0225964 A1 | 11/2004 | Simonyi | |
| 2005/0097533 A1 | 5/2005 | Chakrabarti et al. | |
| 2005/0216885 A1* | 9/2005 | Ireland | G06F 9/4428 717/108 |
| 2006/0048095 A1 | 3/2006 | Meijer et al. | |
| 2006/0150146 A1* | 7/2006 | Meijer et al. | 717/108 |
| 2006/0242115 A1 | 10/2006 | Baras et al. | |
| 2006/0259541 A1 | 11/2006 | Bernabeu-Auban et al. | |
| 2007/0028223 A1 | 2/2007 | Meijer et al. | |
| 2007/0038978 A1* | 2/2007 | Meijer | G06F 8/437 717/106 |
| 2007/0073712 A1* | 3/2007 | Falk | G06F 17/30923 |
| 2007/0083551 A1 | 4/2007 | Jezierski et al. | |
| 2007/0245325 A1 | 10/2007 | Lapounov et al. | |
| 2008/0215520 A1 | 9/2008 | Gu et al. | |
| 2008/0282238 A1 | 11/2008 | Meijer et al. | |
| 2009/0187882 A1 | 7/2009 | Jazdzewski | |
| 2009/0313613 A1 | 12/2009 | Ben-Artzi et al. | |
| 2009/0319554 A1 | 12/2009 | Krishnaswamy et al. | |
| 2010/0023486 A1 | 1/2010 | Baras et al. | |
| 2010/0088661 A1 | 4/2010 | Langworthy et al. | |
| 2010/0088665 A1 | 4/2010 | Langworthy et al. | |
| 2010/0088666 A1* | 4/2010 | Box et al. | 717/104 |
| 2010/0088674 A1* | 4/2010 | Della-Libera | G06F 17/2705 717/114 |
| 2010/0169868 A1 | 7/2010 | Condit et al. | |
| 2010/0211924 A1 | 8/2010 | Begel et al. | |
| 2010/0299660 A1 | 11/2010 | Torgersen et al. | |
| 2011/0131559 A1* | 6/2011 | Young | G06F 8/314 717/145 |
| 2011/0154378 A1* | 6/2011 | Kishan | G06F 9/4426 719/328 |
| 2011/0167404 A1 | 7/2011 | Liu et al. | |
| 2011/0258593 A1* | 10/2011 | Ng et al. | 717/106 |
| 2011/0276950 A1 | 11/2011 | Fisher et al. | |
| 2012/0137367 A1 | 5/2012 | Dupont et al. | |
| 2012/0151495 A1 | 6/2012 | Burckhardt et al. | |
| 2012/0215731 A1 | 8/2012 | Junker | |
| 2014/0130016 A1 | 5/2014 | Menghrajani et al. | |

OTHER PUBLICATIONS

Owen Arden et al.; Sharing Mobile Code Securely With Information Flow Control ; 2012 IEEE; pp. 191-205; <http://ieeexplore.ieee.org/stamp/stamp.jsp?arnumber=6234413>.*

David Gay et al.; Software Design Patterns for TinyOS; 2005 ACM; pp. 40-49; <http://dl.acm.org/citation.cfm?id=1065917>.*

Dirk Muthig et al.; Generic Implementation of Product Line Components; 2002 Springer; pp. 313-329; <http://link.springer.com/chapter/10.1007/3-540-36557-5_23>.*

Robert L. Akers et al.; Re-engineering C++ Component Models Via Automatic Program Transformation; 2005 IEEE; 10 pages; <http://ieeexplore.ieee.org/stamp/stamp.jsp?arnumber=1566142>.*

Susan Eisenbach et al.; Feeling the way through DLL Hell; 2002 Doc UK; 11 pages; <http://www.doc.ic.ac.uk/~susan/475/USEpaper.pdf>.*

Kathleen A. Lindlan et al.; A Tool Framework for Static and Dynamic Analysis of Object-Oriented Software with Templates; 2000 IEEE; 11 pages; <http://ieeexplore.ieee.org/stamp/stamp.jsp?arnumber=1592762>.*

"Technical Overview", Retrieved at<<http://www.dartlang.org/docs/technical-overview/>>, Retrieved Date: Nov. 5, 2012, pp. 1-6.

Esposito, Dino., "C# 4.0, the Dynamic Keyword and COM", Retrieved at <<http://msdn.microsoft.com/en-us/magazine/ff714583.aspx>>, Jun. 2010, pp. 1-6.

Zakas, Nicholas C., "Thoughts on TypeScript", Retrieved at <<http://www.nczonline.net/blog/2012/10/04/thoughts-on-type-script/>>, Oct. 4, 2012, pp. 1-11.

Hoban, Luke, "Announcing TypeScript 0.8.1", Retrieved From <<https://blogs.msdn.microsoft.com/typescript/2012/11/15/announcing-typescript-0-8-1/>>, Nov. 15, 2012, 3 pages.

"C# Type Inference", Retrieved From <<https://web archive.org/web/20120915033358/http://codersource.net/MicrosoftNet/CNet30/CTypeInference.aspx>>, Nov. 5, 2012, 4 Pages.

"Final Office Action Issued in U.S. Appl. No. 13/798,095", Mailed Date: Mar. 5, 2015, 27 Pages.

"Final Office Action Issued in U.S. Appl. No. 13/798,095", Mailed Date: Dec. 17, 2015, 19 Pages.

"Non Final Office Action Issued in U.S. Appl. No. 13/798,095", Mailed Date: Aug. 28, 2015, 16 Pages.

"Non Final Office Action Issued in U.S. Appl. No. 13/798,095", Mailed Date: Oct. 21, 2014, 22 Pages.

"Non Final Office Action Issued in U.S. Appl. No. 13/798,095", Mailed Date: May 25, 2016, 10 Pages.

"Notice of Allowance Issued in U.S. Appl. No. 13/798,095", Mailed Date: Sep. 13, 2016, 7 Pages.

"Final Office Action Issued in U.S. Appl. No. 13/798,100", Mailed Date: Mar. 17, 2016, 22 Pages.

"Final Office Action Issued in U.S. Appl. No. 13/798,100", Mailed Date: Apr. 7, 2015, 27 Pages.

"Non Final Office Action Issued in U.S. Appl. No. 13/798,100", Mailed Date: Nov. 20, 2015, 22 Pages.

"Non Final Office Action Issued in U.S. Appl. No. 13/798,100", Mailed Date: Sep. 18, 2014, 26 Pages.

"Non Final Office Action Issued in U.S. Appl. No. 13/798,100", Mailed Date: Jul. 29, 2016, 22 Pages.

"Final Office Action Issued in U.S. Appl. No. 13/798,107", Mailed Date: Mar. 6, 2015, 32 Pages.

"Final Office Action Issued in U.S. Appl. No. 13/798,107", Mailed Date: Nov. 27, 2015, 26 Pages.

"Final Office Action Issued in U.S. Appl. No. 13/798,107", Mailed Date: Jun. 6, 2016, 22 Pages.

"Non Final Office Action Issued in U.S. Appl. No. 13/798,107", Mailed Date: Oct. 29, 2014, 30 Pages.

"Non Final Office Action Issued in U.S. Appl. No. 13/798,107", Mailed Date: Jul. 16, 2015, 23 Pages.

"Notice of Allowance Issued in U.S. Appl. No. 13/798,107", Mailed Date: Oct. 12, 2016, 9 Pages.

Aiken, et al., "Dynamic Typing and Subtype Inference", In Proceedings of Seventh International Conference on Functioanl programming Languages and Computer Architecture, Oct. 1, 1995, 10 Pages.

Amadio, et al., "Subtyping Recursive Types", In Proceedings of the 18th ACM SIGPLAN-SIGACT Symposium on Principles of Programming Languages, Jan. 3, 1991, pp. 104-118.

Barnes, et al., "On the Principled Design of Object Oriented Programming Languages for High Integrity Systems", In Proceedings of the 2nd NASA/FAA Object Oriented Technology in Aviation Workshop, Mar. 27, 2003, 12 Pages.

Bayne, et al., "Always-Available Static and Dynamic Feedback", In Proceedings of the 33rd International Conference on Software Engineering, May 21, 2011, 10 Pages.

Bessey, et al., "A few Billion Lines of code Later using static Analysis to find Bugs in the Real World" In Communications of the ACM, vol. 53, Issue 2, Feb. 1, 2010, pp. 66-75.

(56) References Cited

OTHER PUBLICATIONS

Buneman, et al., "A Query Language and Optimization Techniques for Unstructured Data", In Proceedings of the ACM SIGMOD International Conference on Management of Data, Jun. 1, 1996, pp. 505-516.

Buneman, et al., "Programming Constructs for Unstructured Data", In Institute for Research In Cognitive Science (IRCS) Technical Reports Series, Mar. 1, 1995, 12 Pages.

Engler, et al., "Checking System Rules Using System-Specific, Programmer-Written Compiler Extensions", In Proceedings of the 4th conference on Symposium on Operating System Design & Implementation, vol. 4, Article 1, Oct. 22, 2000, 16 pages.

Flanagan, et al., "Extended Static Checking for Java", In Proceedings of the ACM SIGPLAN Conference on Programming Language Design and Implementation, Jun. 17, 2002, pp. 234-245.

Gundry, et al., "Type Inference in Context", In Proceedings of Third ACM SIGPLAN Workshop on Mathematically Structured Functional Programming, Sep. 25, 2010, 13 Pages.

Haldiman, et al., "Practical Pluggable Types for a Dynamic Language", In Proceedings of Computer Languages, Systems & Structures, vol. 35, Issue 1, Apr. 2009, 31 Pages.

Hallem, et al., "A System and Language for Building System-Specific Static Analyses", In Proceedings of the ACM SIGPLAN Conference on Programming language design and implementation, Jun. 17, 2002, pp. 69-82.

Heeren, et al., "Generalizing Hindley-Milner Type Inference Algorithms", In Technical Report UU-CS-2002-031, Institute of Information and Computing Sciences, Jul. 8, 2002, 28 Pages.

Hendren, et al., "Parallelizing Programs with Recursive Data Structures", In Journal of IEEE Transactions on Parallel and Distributed Systems, vol. 1, Issue 1, Jan. 1, 1990, pp. 35-47.

Klarlund, et al., "Graph Types", In Proceedings of the 20th ACM SIGPLAN-SIGACT Symposium on Principles of Programming Languages, Mar. 1, 1993, pp. 196-205.

Lindahl, et al., "Practical Type Inference Based on Success Typings", In Proceedings of the 8th ACM SIGPLAN International Conference on Principles and Practice of Declarative Programming, Jul. 10, 2006, pp. 167-178.

Necula, et al., "CCured: Type-Safe Retrofitting of Legacy Code", In Proceedings of the 29th ACM SIGPLAN-SIGACT symposium on Principles of programming languages, Jan. 16, 2002, pp. 128-139.

Paige, et al., "Specification-Driven Development of an Executable Metamodel in Eiffel", In Proceedings of Essentials of the 3rd UML Workshop in Software Model Engineering, Oct. 11, 2004, 8 Pages.

Reiss, Steven P., "PECAN Program Development Systems that Support Multiple Views", In IEEE Transactions on Software Engineering, vol. 11, Issue 3, Mar. 1985, pp. 276-285.

Saraswat, et al., "Constrained Types for Object-Oriented Languages", In Proceedings of the 23rd ACM SIGPLAN conference on Object-oriented programming systems languages and applications, Oct. 19, 2008, 28 Pages.

Viega, et al., "ITS4: A Static Vulnerability Scanner for C and C++ Code", In Proceedings of the 16th Annual Computer Security Applications Conference, Dec. 11, 2000, 11 Pages.

Wyk, et al., "Adding Syntax and Static Analysis to Libraries via Extensible Compilers and Language Extensions", In Proceedings of Library-Centric Software Design (LCSD), Oct. 2006, 10 Pages.

"Notice of Allowance Issued in U.S. Appl. No. 13/798,095", Mailed Date Dec. 16, 2016, 10 Pages.

Boyapati, et al., "Ownership Types for Safe Programming Preventing Data Races and Deadlocks", In Proceedings of the 17th ACM SIGPLAN conference on Object-oriented programming, systems, languages, and applications, Nov. 4, 2002, pp. 211-230.

Chambers, et al., "Customization Optimizing Compiler Technology for SELF a Dynamically-Typed Object-Oriented Programming Language", In Proceedings of the ACM SIGPLAN 1989 conference on Programming language design and implementation, Jun. 21, 1989, pp. 146-160.

Furr, et al., "Static Type Inference for Ruby", In Proceedings of the 2009 ACM symposium on Applied Computing, Mar. 8, 2009, 1859-1866.

Huang, et al., "Securing Web Application Code by Static Analysis and Runtime Protection", In Proceedings of the 13th International Conference on World Wide Web, May 17, 2004, pp. 40-51.

Myers, C. Andrew., "JFlow Practical Mostly-Static Information Flow Control", In Proceedings of the 26th ACM SIGPLAN-SIGACT symposium on Principles of programming languages, Jan. 1, 1999, pp. 228-241.

Sheard, et al., "Template Meta-programming for Haskell", In Proceedings of ACM SIGPLAN Notices, vol. 37, Issue 12, Oct. 3, 2002, 16 Pages.

\* cited by examiner

STATIC TYPE CHECKING ACROSS MODULE UNIVERSES

CROSS-REFERENCE TO RELATED APPLICATIONS

The application is related in subject matter to co-pending U.S. patent application Ser. No. 13/798,095 entitled "STATICALLY EXTENSIBLE TYPES", filed on Mar. 13, 2013. The application is related in subject matter to co-pending U.S. patent application Ser. No. 13/798,100 entitled "CONTEXTUAL TYPING", filed on Mar. 13, 2013. The application is related in subject matter to co-pending U.S. patent application Ser. No. 13/798,107 entitled "GRAPH-BASED MODEL FOR TYPE SYSTEMS", filed on Mar. 13, 2013.

BACKGROUND

Computer programming languages support various data types that can be assigned to variables or expressions. Data types include strings, floating point numbers, integers and so on. Assigning the wrong data type to a variable or expression can cause a program to malfunction or to stop running. Type checking is one way to ensure that the wrong data type is not assigned to a variable or expression. Type checking can be performed at compile time (static type checking) or at runtime (dynamic type checking). Static type checking is able to verify that the type checked conditions hold for all possible executions of the program. Dynamic type checking is able to verify that a particular execution of a program is free of type errors. Therefore, dynamic type checking is typically performed each time the program is run.

SUMMARY

Static type checking can be performed on types and values defined in modules in a system that dynamically composes executable programs from modules. The term "module" as used herein refers to a separately loaded body of code that creates and initializes a singleton module instance. A module can be referenced using an external module name. As used herein, modules are part of the statically typed programming language, and the statements and declarations express concepts from the statically typed programming language. In dynamically composing systems, each module exists in a separate namespace, such that variable declarations do not conflict or interact across modules. However, explicit declarative imports may be used within a module to give locally scoped names to entities defined in other modules. A language mechanism can be used to establish a local name binding to one module within the content of another module. A module data type is provided by a language concept in which a module is a container for other data types. Within a module, declarations of various variables, classes, other modules, etc. can exist. Data hiding or encapsulation can be implemented in a language that does not support data encapsulation by having different visibility constraints placed on the variables, classes, other modules, etc. declared within each module.

A "visible" constraint enables the variables, classes, other modules, etc. to be visible wherever the module is defined. A second ("not visible") constraint allows the variable, class, etc. to be visible only in the module or file in which the module is declared. The static type system can determine dependencies of modules at compile time based on declarative imports. The static type system can map names of types and values defined in a plurality of modules in a way that is consistent with dynamic name binding of objects. When type checking at compile time, an environment can be established that corresponds to a runtime instance of the program. A language mechanism can be used to perform mapping between a static type and a runtime value. Aliases of a particular type are resolved to a known compile time description of the type.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Overview

A static type system typically establishes a global namespace of values and types, and associates each expression and statement in the program with data types that can be validly assigned to the expression based on the global namespace of values and types. At compile time, the static type checker checks that the data types associated with the expressions in the source code are correct.

A dynamic runtime system that uses modules for composing programs can segment the runtime view of an executing program into separate disjoint module universes. Running programs in disjoint module universes can be useful for isolation of execution because different modules are compiled and executed separately. However, static type checking of the aggregate program is challenging because the full system of modules which will be loaded dynamically has to be known in advance and relationships between modules have to be established before execution. In dynamic systems, dependencies are resolved as modules are loaded. It is difficult for a static system to understand interdependencies between modules statically. (Statically understanding interdependencies that exist between module universes at runtime is challenging for a static type system executing at compile time.)

Disjoint module universes can refer to instances of the same element using different names. It is difficult for a static system to know how to map elements referred to by different names to the correct type. Finally, types in a module universe of a dynamic runtime system can come from other module universes, which the module universe understands because of dynamically resolving dependencies. It is difficult for a static universe to assign locally scoped names to remotely defined types and instances. For at least these reasons, static type languages typically avoid the use of disjoint module universes. Similarly, dynamic languages that use a module system do not try to have a static view of the module system. Static type checking and therefore tooling based on static type systems is thus unavailable at development time for traditional dynamic module-based runtime systems.

In accordance with aspects of the subject matter described herein, a static type system accommodates the use of disjoint module universes at runtime by mapping types defined in disjoint module universes into other module universes in a way that is consistent with the dynamic name binding of object instances. The type definition associated with a module can be statically determined based on type checking. Type definition of the module can be based on the set of definitions in the module. In accordance with aspects of the subject matter described herein, the type system's view of modules can include both values and types. The type system's view of modules can include elements such as but not limited to classes that include both values and types. Static type and the runtime value can be mapped to each other's local name binding. Aliases of a type can be understood to refer to the same type.

In accordance with some aspects of the subject matter described herein, an example of a programming language supporting static type checking across module universes in a dynamic runtime is TypeScript. Typescript is a superset of JavaScript, meaning that any valid JavaScript code is valid TypeScript code. TypeScript adds additional features on top of JavaScript. TypeScript can be converted into JavaScript code by the TypeScript compiler. TypeScript permits the annotation of variables, function arguments, and functions with type information, facilitating the use of static typing to provide tools such as auto-completion tools and enabling more comprehensive error checking than that provided by using traditional JavaScript.

In accordance with some aspects of the subject matter described herein, declarations introduce names in the declaration spaces to which they belong. The global module has a declaration space for global members (variables, functions, modules, and constructor functions), and a declaration space for global types (modules, classes, and interfaces). Each module has a declaration space for local members (variables, functions, modules, and constructor functions), and a declaration space for local types (modules, classes, and interfaces). Every declaration (whether local or exported) in a module contributes to one or both of these declaration spaces. Each module has a declaration space for exported members and a declaration space for exported types. All export declarations in the module contribute to these declaration spaces.

Top-level declarations in a non-module source file belong to the global module. Top-level declarations in a module source file belong to the external module represented by that source file.

An export declaration can declare an externally accessible module member including but not limited to members such as, for example, an export variable statement, function declaration, class declaration, interface declaration or module declaration. An export declaration can be distinguished from a regular declaration by, for example, being prefixed with a keyword such as "export", etc. Exported variable, function, class, and module declarations can become properties on the module instance and together can establish the module's instance type. The module's instance type can have any combination of the following members: a property for each exported variable declaration, a property of a function type for each exported function declaration, a property of a constructor type for each exported class declaration and/or a property of an object type for each exported internal module declaration.

In accordance with aspects of the subject matter described herein, module instance types can be referenced by using module identifiers as type names. An exported member can depend on a set of named types. The named types upon which a member depends can be the named types occurring in the transitive closure of the "directly depends on" relationship defined as follows:

A variable directly depends on its type.
A function directly depends on its function type.
A class directly depends on its constructor function type and its class instance type.
An interface directly depends on the type it declares.
A module directly depends on its module instance type.
An object type directly depends on the types of each of its public properties and the parameter and return types of each of its call, construct, and index signatures.

The term "module" as used herein refers to a body of statements and declarations that create and initialize a singleton module instance. Members exported from a module become properties on the module instance. The body of a module corresponds to a function that is executed once, thereby providing a mechanism for isolating local state. In accordance with aspects of the subject matter described herein, TypeScript supports modules. A module can be a separately loaded body of code referenced using an external module name. A module can be written as a separate source file that includes at least one import or export declaration.

An export declaration can be identified by an "export" prefix or by any other suitable means. Exported variable, function, class, and module declarations can become properties on the module instance and together establish the module's instance type. The exported type can have the following members:

A property for each exported variable declaration.
A property of a function type for each exported function declaration.
A property of a constructor type for each exported class declaration.
An exported member depends on a set of named types. The set of named types can be the empty set. The named types upon which a member depends can be the named types occurring in the transitive closure of the types of all members of named types visible from a given location as follows:
A variable directly depends on its type.
A function directly depends on its function type.
A class directly depends on its constructor function type and its class instance type.
An interface directly depends on the type it declares.
An object type directly depends on the types of each of its public properties and the parameter and return types of each of its call, construct, and index signatures.

Import declarations can be used to import modules and to create local aliases by which the modules may be referenced. An import declaration can introduce a local identifier that references a given module. The local identifier can itself be classified as a module and can behave like a module. A string literal specified in an module reference can be interpreted as an module name. Import declarations in modules can specify either external module references or module names.

Modules can be separately loaded bodies of code referenced using external module names. Modules can be written as separate source files that contain at least one import declaration or export declaration. Below is an example of two modules written in separate source files.

```
File main.ts:
    import log = module("log");
    log.message("hello");
File log.ts:
    export function message(s: string) {
        console.log(s);
    }
```

In this example, two files define the "main" and "log" modules. The "main" module imports the "log" module and then uses functionality ("message") exported from the "log" module, passing it a value "hello". The "log" module exports a function that provides a way to log onto the console.

In the file "main.ts", the import declaration references the "log" module. Compiling the "main.ts" file causes the "log.ts" file to also be compiled as part of the program. At runtime, the import declaration loads the "log" module and produces a reference to the "log" module instance through which it is possible to reference the function exported by the "log" module.

Modules can be identified and referenced using external module names. The set of legal module names is defined by the runtime module loader system that the compiler for the statically typed language targets.

Static Type Checking Across Module Universes

Figure 1A:
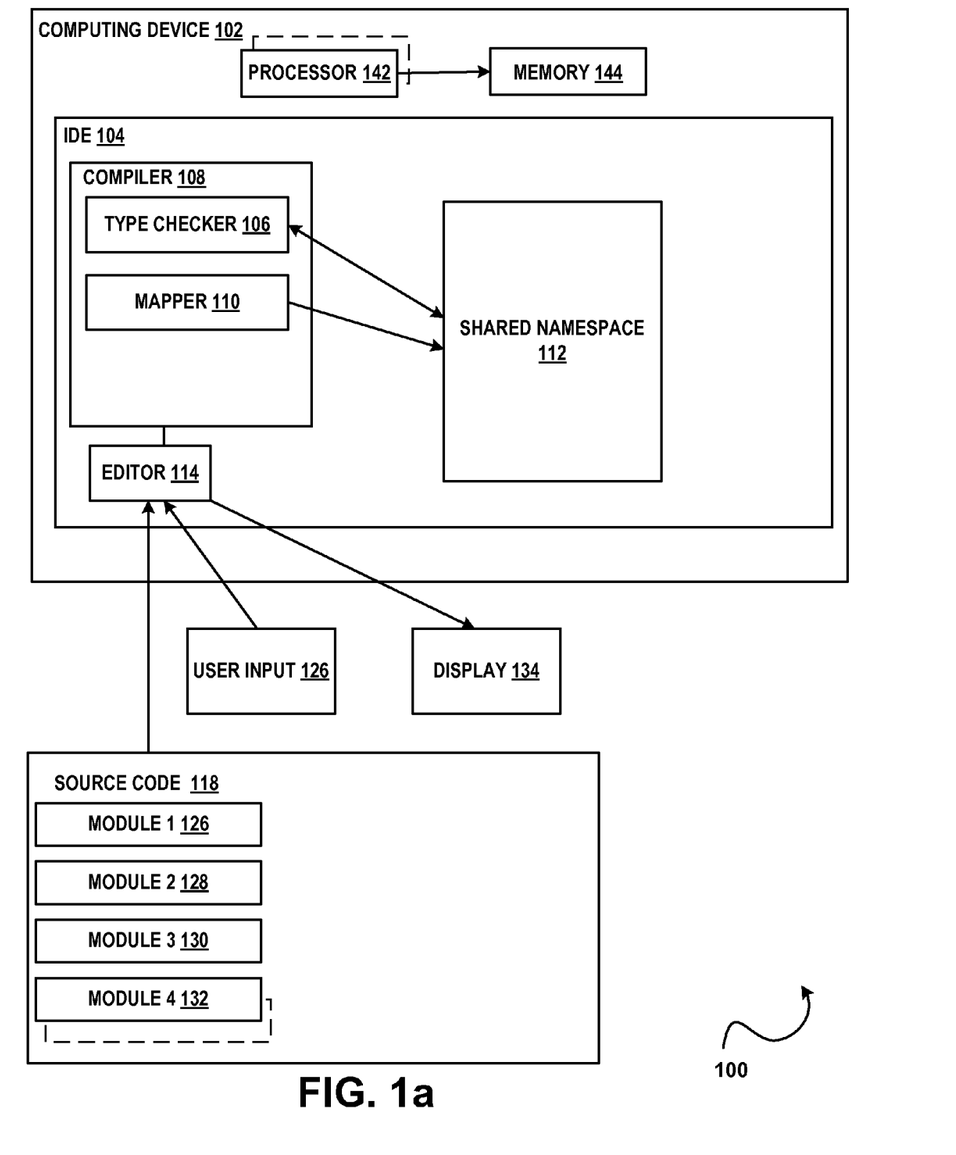
FIG. 1a illustrates an example of a system 100 that enables static type checking across module universes in accordance with aspects of the subject matter described herein.

FIG. 1a illustrates a block diagram of an example of a system 100 in accordance with aspects of the subject matter described herein. All or portions of system 100 may reside on one or more computers or computing devices such as the computers described below with respect to FIG. 3. System 100 or portions thereof may be provided as a stand-alone system or as a plug-in or add-in. System 100 or portions thereof may include information obtained from a service (e.g., in the cloud) or may operate in a cloud computing environment. A cloud computing environment can be an environment in which computing services are not owned but are provided on demand. For example, information may reside on multiple devices in a networked cloud and/or data can be stored on multiple devices within the cloud. System 100 may execute in whole or in part on a software development computer such as the software development computer described with respect to FIG. 4. All or portions of system 100 may be operated upon by program development tools. For example, all or portions of system 100 may execute within an integrated development environment (IDE) such as for example IDE 104. IDE 104 may be an IDE as described more fully with respect to FIG. 4 or can be another IDE. System 100 can execute wholly or partially outside an IDE.

System 100 can include one or more computing devices such as, for example, computing device 102. A computing device such as computing device 102 can include one or more processors such as processor 142, etc., and a memory such as memory 144 connected to the one or more processors. Computing device 102 can include one or more components comprising a compiler such as compiler 108. A compiler such as compiler 108 may be a computer program or set of programs that translates text written in a (typically high-level) programming language into another (typically lower-level) computer language (the target language). The output of the compiler may be object code. Typically the output is in a form suitable for processing by other programs (e.g., a linker), but the output may be a human-readable text file. Source code is typically compiled to create an executable program but may be processed by program development tools which may include tools such as editors, beautifiers, static analysis tools, refactoring tools and others that operate in background or foreground.

A compiler 108 may comprise a .NET compiler that compiles source code written in a .NET language to intermediate byte code. .NET languages include but are not limited to C#, C++, F#, J#, JScript.NET, Managed Jscript, IronPython, IronRuby, VBx, VB.NET, Windows PowerShell, A#, Boo, Cobra, Chrome (Object Pascal for .NET, not the Google browser), Component Pascal, IKVM.NET, IronLisp, L#, Lexico, Mondrian, Nemerle, P#, Phalanger, Phrogram, PowerBuilder, #Smalltalk, AVR.NET, Active Oberon, APLNext, Common Larceny, Delphi.NET, Delta Forth .NET, DotLisp, EiffelEnvision, Fortran .NET, Gardens Point Modula-2/CLR, Haskell for .NET, Haskell.net, Hugs for .NET, IronScheme, LOLCode.NET, Mercury on .NET, Net Express, NetCOBOL, OxygenScheme, S#, sml.net, Wildcat Cobol, X# or any other .NET language. Compiler 108 may comprise a JAVA compiler that compiles source code written in JAVA to byte code. Compiler 108 can be any compiler for any programming language including but not limited to Ada, ALGOL, SMALL Machine Algol Like Language, Ateji PX, BASIC, BCPL, C, C++, CLIPPER 5.3, C#, CLEO, CLush, COBOL, Cobra, Common Lisp, Corn, Curl, D, DASL, Delphi, DIBOL, Dylan, dylan.NET, eC (Ecere C), Eiffel, Sather, Ubercode, eLisp Emacs Lisp, Erlang, Factor, Fancy, Formula One, Forth, Fortran, Go, Groovy, Haskell, Harbour, Java, JOVIAL, LabVIEW, Nemerle, Obix, Objective-C, Pascal, Plus, ppC++, RPG, Scheme, Smalltalk, ML, Standard ML, Alice, OCaml, Turing, Urq, Vala, Visual Basic, Visual FoxPro, Visual Prolog, WinDev, X++, XL, and/or Z++. Compiler 108 can be a compiler for any typed programming language.

A compiler such as compiler 108 and/or program development tools are likely to perform at least some of the following operations: preprocessing, lexical analysis, parsing (syntax analysis), semantic analysis, code generation, and code optimization. Compiler 108 may include one or more modules comprising a parser that receives program source code and generates a parse tree.

System 100 can include one or more program components such as type checker 106 that performs static type checking across module universes as described herein. Type checker 106 can be a part of a compiler 108 as illustrated in FIG. 1a, or can be part of another program development tool (not shown). Type checker 106 can be a separate entity, plug-in, or add-on (not shown). It will be appreciated that program components such as for example, type checker 106 that performs static type checking across module universes can be loaded into memory 144 to cause one or more processors such as processor 142, etc. to perform the actions attributed to type checker 106. System 100 can include any combination of one or more of the following: an editor such as but not limited to editor 114, a display device such as display device 134, and so on. Editor 114 can receive source code such as source code 118 and user input such as user input 126. Results such as the results of static type checking on dynamically composed module universes can be displayed on display device 134. Other components well known in the arts may also be included but are not here shown.

A compiler such as compiler 108 can receive source code in the form of one or more program modules such as, for example, module 1 126, module 2 128, module 3 130, module 4, 132, etc. The program modules may represent a TypeScript program. In accordance with aspects of the subject matter disclosed herein, a TypeScript program may include one or more source code files. A source file can be an implementation source file. A source file can be a declaration source file. In accordance with some aspects of the subject matter described herein, implementation source files and declaration source files can be distinguished by the file extension used. For example, source files with extension '.ts' can be implementation source files that include statements and declarations. Source files with extension '.d.ts' can be declaration source files that include declarations. Source code files can include export and import statements that are used to implement static type checking across module universes as described more fully below.

System 100 can include one or more compiler components such as mapper 110 that can create a shared namespace 112 used to perform static type checking across module universes as described herein. Mapper 110 can be a part of a compiler 108 as illustrated in FIG. 1a, or can be part of another program development tool (not shown). Mapper 110 can be a separate entity, plug-in, or add-on (not shown). It will be appreciated that compiler components such as for example, mapper 110 that performs static type checking across module universes can be loaded into memory 144 to cause one or more processors such as processor 142, etc. to perform the actions attributed to mapper 110.

Figure 1B:
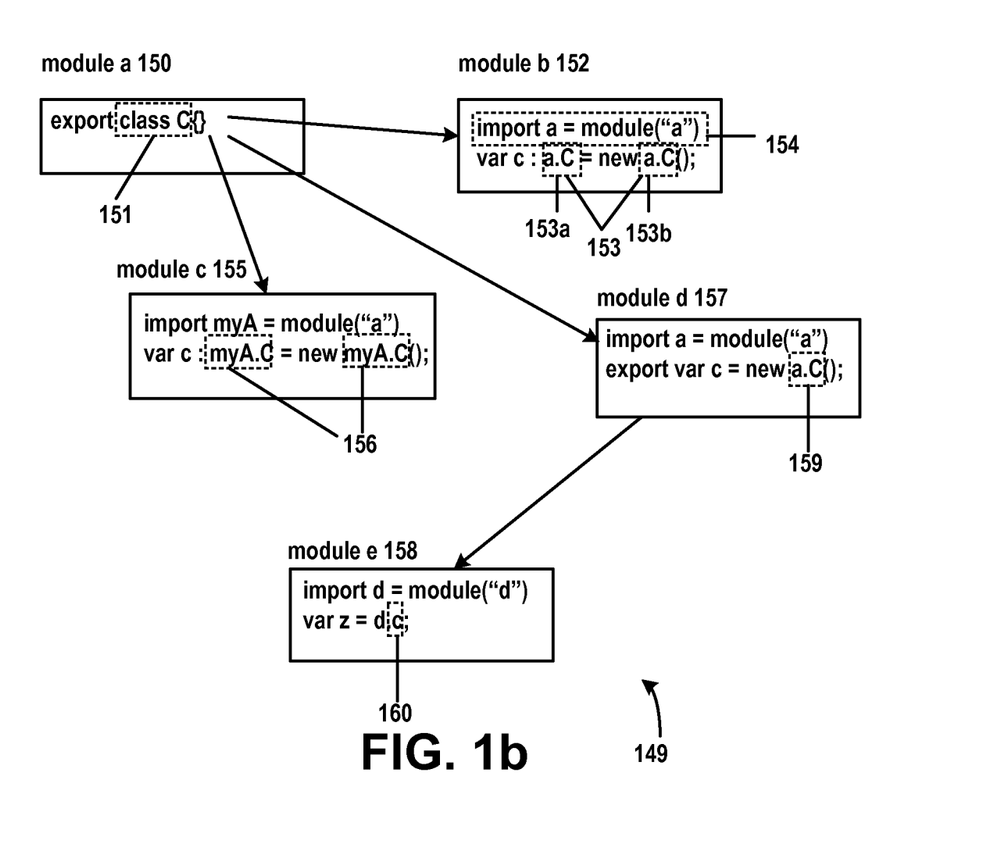
FIG. 1b illustrates an example 149 of interdependencies between modules in accordance with aspects of the subject matter disclosed herein.

FIG. 1b illustrates examples of modules and relationships between the modules The modules can be loaded as independent files. In FIG. 1b, module a 150 exports a class C 151. Module b 152 imports module a 150 and can refer to class C 151 by any specified name. In this case, the name used to refer to class C is "a.C" 153, because module a 150 was imported by module b 152 ("import a=module("a") 154 class A was given the local name "a" within module b 152. When module b 152 is type checked at compile time, the compiler will create an environment for type checking in which class C is referred to by the name "a.C" 153 in module b 152. (See FIG. 1c, table 161). The syntax of the statement "import a=module("a")" 154 is understood by the mapper 110 to indicate that module b 152 has a dependency on module a 150.

Module b 152 arbitrarily refers to elements imported from module a 150 as "a.[something]", in this case, Class C of module a 150 is referred to by module b 152 as "a.C" 153. Module b 152 provides an example of arranging the nomenclature of the static type system to align with the nomenclature of the runtime system's values. That is, the name used to refer to the value of var c at runtime, i.e., the name "a.C" 153b is the same as the name used to refer to the type of var c in the static type system, "a.C" 153a. Module c 155 also imports module a 150 but refers to elements in module a 150 as "myA.[something]", e.g., "myA.C" 156. Within the context of module c 155 class C 151 in module a 150 is referred to as "myA.C" whereas within the context of module b 152 class C 151 in module a 150 is referred to as a.C 153. Thus the same element (class C) present in two modules are referred to by different names. Types can be exposed within a module which do not have a local name provided by the program text. This is illustrated in modules d 157 and module e 158. Module d 157 imports module a 150 and exports variable c ("a.C" 159) whose type is the type of the class C151 of module a 150.

Module e 158 imports module d 157 but does not import module a 150, so the variable "var z" 160 has the type of class C 151 defined in module a 150, but no local name is available in module e 158 to refer to class C. The type checker can allow type checking and type inference to proceed using a compiler-internal notion of the universe in which the name was defined. The compiler's internal representation of the universe in which the name was defined can be presented to developers by for example, using the file path to the module definition or other identifying characteristics to uniquely identify the module.

Figure 1C:
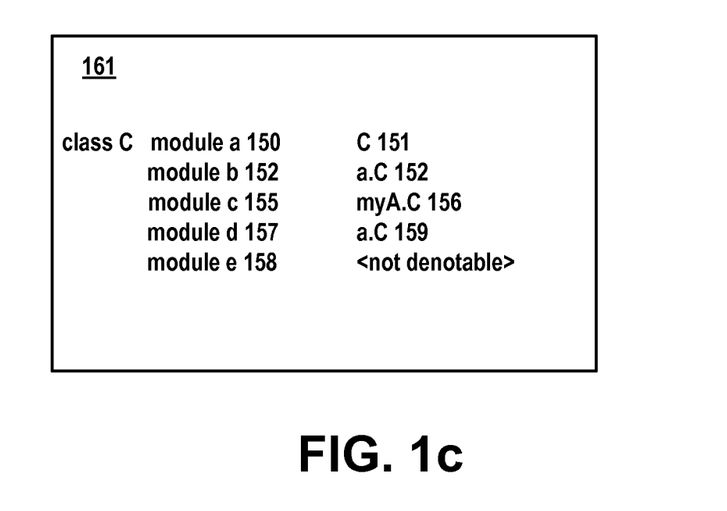
FIG. 1c illustrates an example of a table 161 that represents mapping between various names representing the same thing in accordance with aspects of the subject matter disclosed herein.

FIG. 1c illustrates a table representation 161 of the different names for class C used in different modules (shared namespace 112 of FIG. 1a). In Table 161 class C is represented in module a 150 as C 151, in module b 152 as a.C 152, in module c 155 as myA.C 156, in module d 157 as a.C 159 and class C, as described above, is used, but is not denotable.

Figure 2:
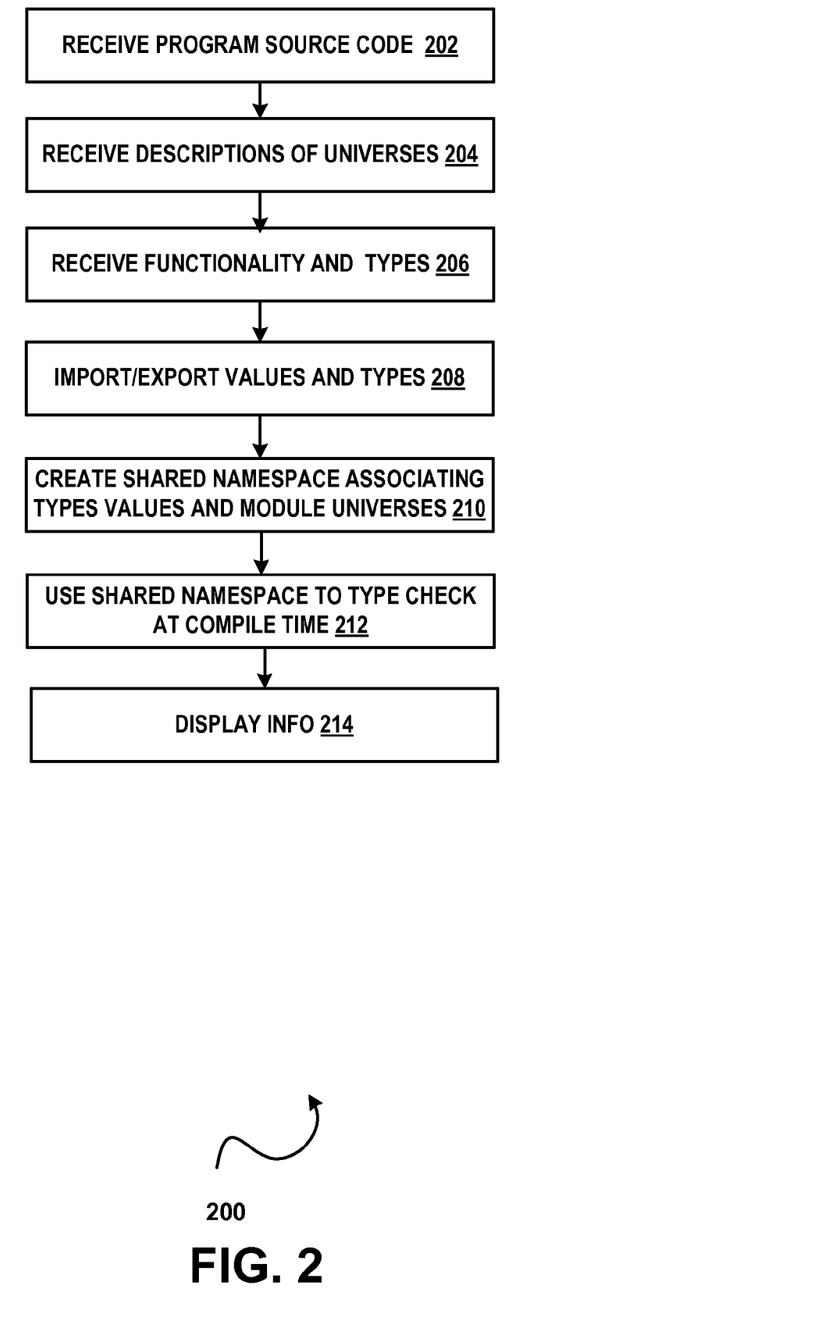
FIG. 2 illustrates an example of a method 200 that performs static type checking across module universes in accordance with aspects of the subject matter disclosed herein.

FIG. 2 illustrates an example of a method 200 for static type checking across module universes in accordance with aspects of the subject matter disclosed herein. The method described in FIG. 2 can be practiced by a system such as but not limited to the one described with respect to FIG. 1a and for which an example was provided in FIGS. 1b-1c. While method 200 describes a series of operations that are performed in a sequence, it is to be understood that method 200 is not limited by the order of the sequence. For instance, some operations may occur in a different order than that described. In addition, one operation may occur concurrently with another operation. In some instances, not all operations described are performed.

At operation 202 inputs can be received by a tool or compiler for a compilation. The inputs can describe a set of module universes in program source code. At operation 204 the compiler can get a set of files or other type of assets that describe the module universes. At operation 206 each of the module universes can provide a set of runtime functionality and a set of types. At operation 208 the module universes can import a set of values and types from other module universes and/or can export a set of values and types to other module universes. At operation 210 the compiler or tool can establish a shared space that is not a global namespace for types and values, where each type and value is associated with the module universe the type or value came from. At operation 212 static type checking can be performed on each module universe using the shared space. Data can be type checked using module universes distinguished by which module universe the type or value comes from. At operation 214 the results of static type checking on dynamically composed module universes can be displayed.

Example of a Suitable Computing Environment

Figure 3:
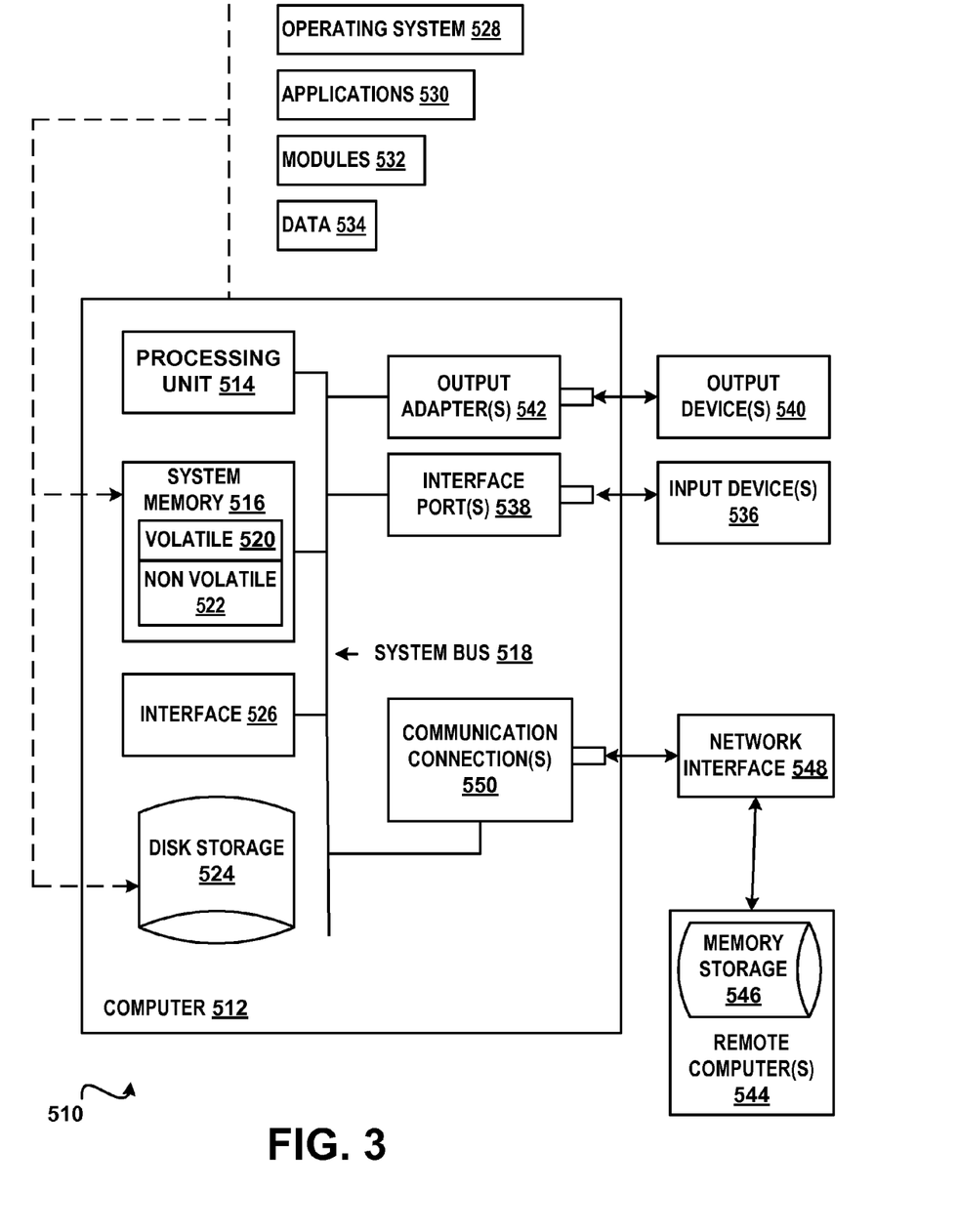
FIG. 3 is a block diagram of an example of a computing environment in accordance with aspects of the subject matter disclosed herein.

In order to provide context for various aspects of the subject matter disclosed herein, FIG. 3 and the following discussion are intended to provide a brief general description of a suitable computing environment 510 in which various embodiments of the subject matter disclosed herein may be implemented. While the subject matter disclosed herein is described in the general context of computer-executable instructions, such as program modules, executed by one or more computers or other computing devices, those skilled in the art will recognize that portions of the subject matter disclosed herein can also be implemented in combination with other program modules and/or a combination of hardware and software. Generally, program modules include routines, programs, objects, physical artifacts, data structures, etc. that perform particular tasks or implement particular data types. Typically, the functionality of the program modules may be combined or distributed as desired in various embodiments. The computing environment 510 is only one example of a suitable operating environment and is not intended to limit the scope of use or functionality of the subject matter disclosed herein.

With reference to FIG. 3, a computing device in the form of a computer 512 is described. Computer 512 may include at least one processing unit 514, a system memory 516, and a system bus 518. The at least one processing unit 514 can execute instructions that are stored in a memory such as but not limited to system memory 516. The processing unit 514 can be any of various available processors. For example, the processing unit 514 can be a graphics processing unit (GPU). The instructions can be instructions for implementing functionality carried out by one or more components or modules discussed above or instructions for implementing one or more of the methods described above. Dual microprocessors and other multiprocessor architectures also can be employed as the processing unit 514. The computer 512 may be used in a system that supports rendering graphics on a display screen. In another example, at least a portion of the computing device can be used in a system that comprises a graphical processing unit. The system memory 516 may include volatile memory 520 and nonvolatile memory 522. Nonvolatile memory 522 can include read only memory (ROM), programmable ROM (PROM), electrically programmable ROM (EPROM) or flash memory. Volatile memory 520 may include random access memory (RAM) which may act as external cache memory. The system bus 518 couples system physical artifacts including the system memory 516 to the processing unit 514. The system bus 518 can be any of several types including a memory bus, memory controller, peripheral bus, external bus, or local bus and may use any variety of available bus architectures. Computer 512 may include a data store accessible by the processing unit 514 by way of the system bus 518. The data store may include executable instructions, 3D models, materials, textures and so on for graphics rendering.

Computer 512 typically includes a variety of computer readable media such as volatile and nonvolatile media, removable and non-removable media. Computer readable media may be implemented in any method or technology for storage of information such as computer readable instructions, data structures, program modules or other data. Computer readable media include computer-readable storage media (also referred to as computer storage media) and communications media. Computer storage media includes physical (tangible) media, such as but not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices that can store the desired data and which can be accessed by computer 512. Communications media include media such as, but not limited to, communications signals, modulated carrier waves or any other intangible media which can be used to communicate the desired information and which can be accessed by computer 512.

It will be appreciated that FIG. 3 describes software that can act as an intermediary between users and computer resources. This software may include an operating system 528 which can be stored on disk storage 524, and which can allocate resources of the computer 512. Disk storage 524 may be a hard disk drive connected to the system bus 518 through a non-removable memory interface such as interface 526. System applications 530 take advantage of the management of resources by operating system 528 through program modules 532 and program data 534 stored either in system memory 516 or on disk storage 524. It will be appreciated that computers can be implemented with various operating systems or combinations of operating systems.

A user can enter commands or information into the computer 512 through an input device(s) 536. Input devices 536 include but are not limited to a pointing device such as a mouse, trackball, stylus, touch pad, keyboard, microphone, voice recognition and gesture recognition systems and the like. These and other input devices connect to the processing unit 514 through the system bus 518 via interface port(s) 538. An interface port(s) 538 may represent a serial port, parallel port, universal serial bus (USB) and the like. Output devices(s) 540 may use the same type of ports as do the input devices. Output adapter 542 is provided to illustrate that there are some output devices 540 like monitors, speakers and printers that require particular adapters. Output adapters 542 include but are not limited to video and sound cards that provide a connection between the output device 540 and the system bus 518. Other devices and/or systems or devices such as remote computer(s) 544 may provide both input and output capabilities.

Computer 512 can operate in a networked environment using logical connections to one or more remote computers, such as a remote computer(s) 544. The remote computer 544 can be a personal computer, a server, a router, a network PC, a peer device or other common network node, and typically includes many or all of the elements described above relative to the computer 512, although only a memory storage device 546 has been illustrated in FIG. 3. Remote computer(s) 544 can be logically connected via communication connection(s) 550. Network interface 548 encompasses communication networks such as local area networks (LANs) and wide area networks (WANs) but may also include other networks. Communication connection(s) 550 refers to the hardware/software employed to connect the network interface 548 to the bus 518. Communication connection(s) 550 may be internal to or external to computer 512 and include internal and external technologies such as modems (telephone, cable, DSL and wireless) and ISDN adapters, Ethernet cards and so on.

It will be appreciated that the network connections shown are examples only and other means of establishing a communications link between the computers may be used. One of ordinary skill in the art can appreciate that a computer 512 or other client device can be deployed as part of a computer network. In this regard, the subject matter disclosed herein may pertain to any computer system having any number of memory or storage units, and any number of applications and processes occurring across any number of storage units or volumes. Aspects of the subject matter disclosed herein may apply to an environment with server computers and client computers deployed in a network environment, having remote or local storage. Aspects of the subject matter disclosed herein may also apply to a standalone computing device, having programming language functionality, interpretation and execution capabilities.

Figure 4:
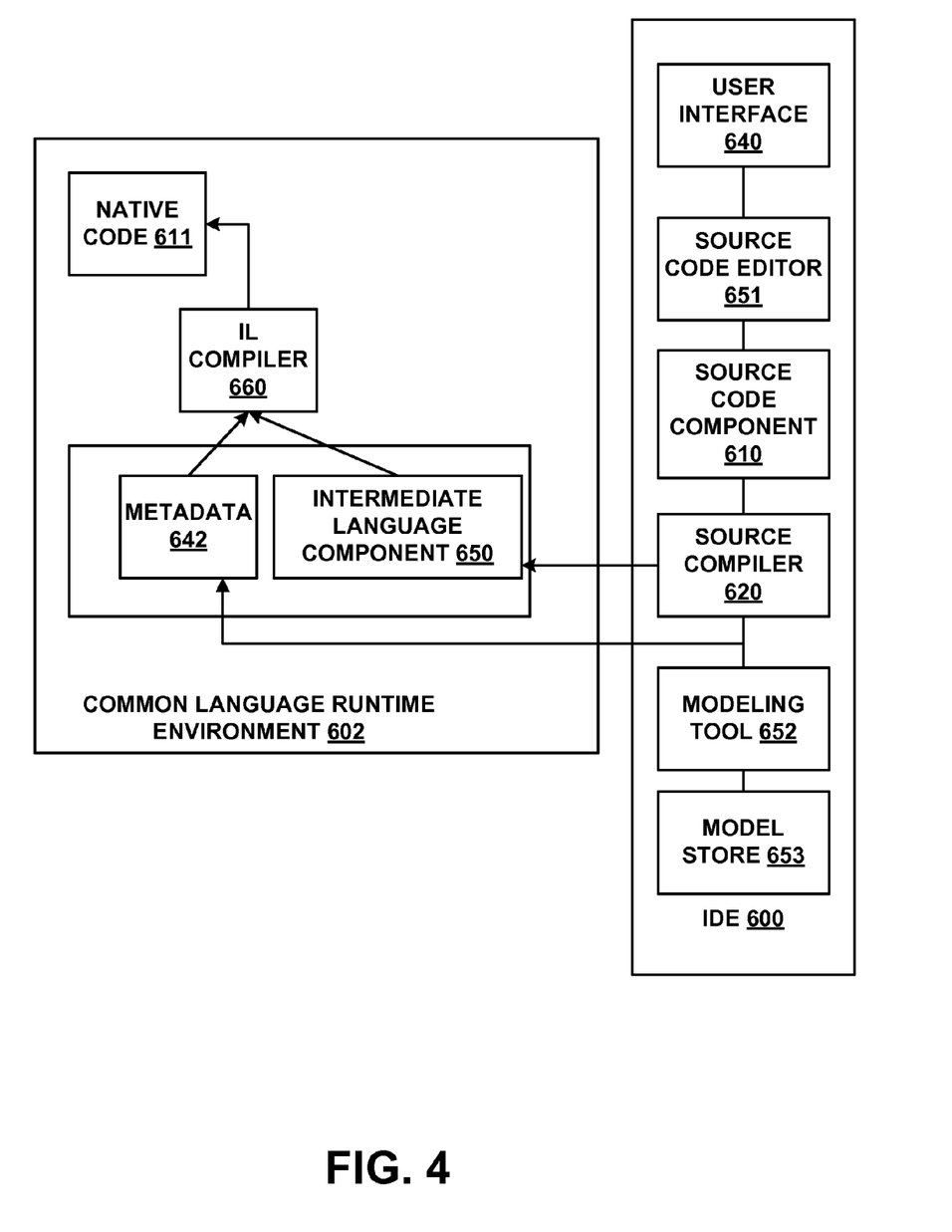
FIG. 4 is a block diagram of an example of an integrated development environment (IDE) in accordance with aspects of the subject matter disclosed herein.

FIG. 4 illustrates an integrated development environment (IDE) 600 and Common Language Runtime Environment 602. An IDE 600 may allow a user (e.g., developer, programmer, designer, coder, etc.) to design, code, compile, test, run, edit, debug or build a program, set of programs, web sites, web applications, and web services in a computer system. Software programs can include source code (component 610), created in one or more source code languages (e.g., Visual Basic, Visual J#, C++. C#, J#, Java Script, APL, COBOL, Pascal, Eiffel, Haskell, ML, Oberon, Pert, Python, Scheme, Smalltalk and the like). The IDE 600 may provide a native code development environment or may provide a managed code development that runs on a virtual machine or may provide a combination thereof. The IDE 600 may provide a managed code development environment using the Microsoft .NET™ framework. An intermediate language component 650 may be created from the source code component 610 and the native code component 611 using a language specific source compiler 620 using a modeling tool 652 and model store 653 and the native code component 611 (e.g., machine executable instructions) is created from the intermediate language component 650 using the intermediate language compiler 660 (e.g. just-in-time (JIT) compiler), when the application is executed. That is, when an intermediate language (IL) application is executed, it is compiled while being executed into the appropriate machine language for the platform it is being executed on, thereby making code portable across several platforms. Alternatively, in other embodiments, programs may be compiled to native code machine language (not shown) appropriate for its intended platform.

A user can create and/or edit the source code component according to known software programming techniques and the specific logical and syntactical rules associated with a particular source language via a user interface 640 and a source code editor 651 in the IDE 600. Thereafter, the source code component 610 can be compiled via a source compiler 620, whereby an intermediate language representation of the program may be created, such as assembly 630. The assembly 630 may comprise the intermediate language component 650 and metadata 642. Application designs may be able to be validated before deployment.

The various techniques described herein may be implemented in connection with hardware or software or, where appropriate, with a combination of both. Thus, the methods and apparatus described herein, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing aspects of the subject matter disclosed herein. As used herein, the term "machine-readable storage medium" shall be taken to exclude any mechanism that provides (i.e., stores and/or transmits) any form of propagated signals. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects, e.g., through the use of a data processing API or the like, may be implemented in a high level procedural or object oriented programming language to communicate with a computer system. However, the program(s) can be implemented in assembly or machine language, if desired. In any case, the language may be a compiled or interpreted language, and combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method comprising:
receiving by a processor of a software development computer, program source code representing a plurality of modules that at runtime comprise a disjoint module universe, at least one module of the plurality of modules exists in a separate namespace from at least one other module of the disjoint module universe, wherein a module is a separately compiled and executed body of code;
analyzing content of the program source code representing the plurality of modules;
creating an environment wherein types and values from different disjoint module universes of a dynamically composing runtime system that dynamically composes software programs from at least one module of a plurality of modules of the different disjoint universe, are used to check the types of expressions described by imports and exports associated with the different disjoint module universe.

2. The method of claim 1, further comprising:
mapping type nomenclature in a static type system to value nomenclature in the dynamically composing runtime system.

3. The method of claim 1, further comprising:
using a language mechanism comprising an import statement to establish a local name binding to a first module of the plurality of modules within content of a second module of the plurality of modules.

4. The method of claim 1, further comprising:
using an explicit declarative import within a first module of the plurality of modules to give a locally scoped name to an entity defined in a second module of the plurality of modules.

5. The method of claim 1, further comprising:
arranging a static type system to align with values of the dynamically composing runtime system, such that a name used to refer to an object at runtime is identical to a name used to refer to a type of the object in the static type system.

6. The method of claim 1, further comprising;
performing type checking at compile time by establishing an environment that corresponds to a runtime instance of a plurality of runtime instances of a program.

7. A system comprising:
at least one processor:
a memory connected to the at least one processor: and
a compiler component that causes the at least one processor to:
perform static type checking in a static type system on a plurality of types and on a plurality of values defined in a plurality of modules, the compiler component executes with a runtime system that dynamically composes a software program from at least one module of the plurality of modules, the at least one module of the plurality of modules exists in a separate namespace from at least one other module of the dynamically composed software program, wherein a module is a separately compiled and executed body of code.

8. The system of claim 7, further comprising:
wherein at least one of the plurality of types is not a global type.

9. The system of claim 7, further comprising:
wherein at least one of the plurality of values is not a global value.

10. The system of claim 7, further comprising:
a compiler component that when loaded into the at least one processor causes the at least one processor to:
use a language mechanism to establish a local name binding to a first module of the plurality of modules within content of a second module of the plurality of modules.

11. The system of claim 7, further comprising:
a compiler component that when loaded into the at least one processor causes the at least one processor to:
map type nomenclature in the static type system to value nomenclature in the runtime system.

12. The system of claim 7, further comprising:
a compiler component that when loaded into the at least one processor causes the at least one processor to:
perform type checking at compile time by establishing an environment that corresponds to a runtime instance of a plurality of possible runtimes of the program.

13. The system of claim 7, further comprising:
a compiler component that when loaded into the at least one processor causes the at least one processor to:
determine runtime dependencies of a first module of the plurality of modules to at least a second module of the plurality of modules at compile time.

14. A device, comprising:
at least one processor and a memory; the at least one processor configured to:
receive by a processor of a software development computer, program source code representing a plurality of modules that at runtime comprises a disjoint module universe, at least one module of the plurality of modules exists in a separate namespace from at least one other module of the disjoint module universe, wherein a module is a separately compiled and executed body of code;
analyze content of the program source code representing the plurality of modules; and
create an environment wherein types and values from different disjoint universes are used to check type expressions using described imports and exports associated with the different disjoint module universes, the plurality of modules executing in a runtime system that dynamically composes software programs from at least one module of the plurality of modules.

15. The device of claim 14, wherein the at least one processor is further configured to:
arrange a static type system to align with runtime values of the disjoint module universe, such that a name used to refer to an object at runtime is identical to a name used to refer to a type of the object in the static type system.

16. The device of claim 14, wherein the at least one processor is further configured to:
perform type checking at compile time by establishing an environment that corresponds to a runtime instance of a plurality of possible runtime instances of a program.

17. The device of claim 14, wherein the at least one processor is further configured:
use a language mechanism to establish a local name binding to a first module of the plurality of modules within content of a second module of the plurality of modules.

18. The device of claim 14, wherein the at least one processor is further configured to:
predetermine dependencies between modules of the plurality of modules at compile time.

19. The device of claim 14, wherein the at least one processor is further configured to:
use a language mechanism comprising an import statement to establish a local name binding to a first module of the plurality of modules within content of a second module of the plurality of modules.

20. The device of claim 14, wherein the at least one processor is further configured to:
map type nomenclature in a static type system to value nomenclature in the dynamically composing runtime system.

* * * * *